April 17, 1962   J. M. SLATER ET AL   3,029,646
GIMBAL SUPPORT FOR A STABLE ELEMENT
Filed March 8, 1956   4 Sheets-Sheet 1

INVENTORS.
JOHN M. SLATER
DONALD E. FINDLEY
BY JOHN F. LEICESTER III

William P. Lane
ATTORNEY

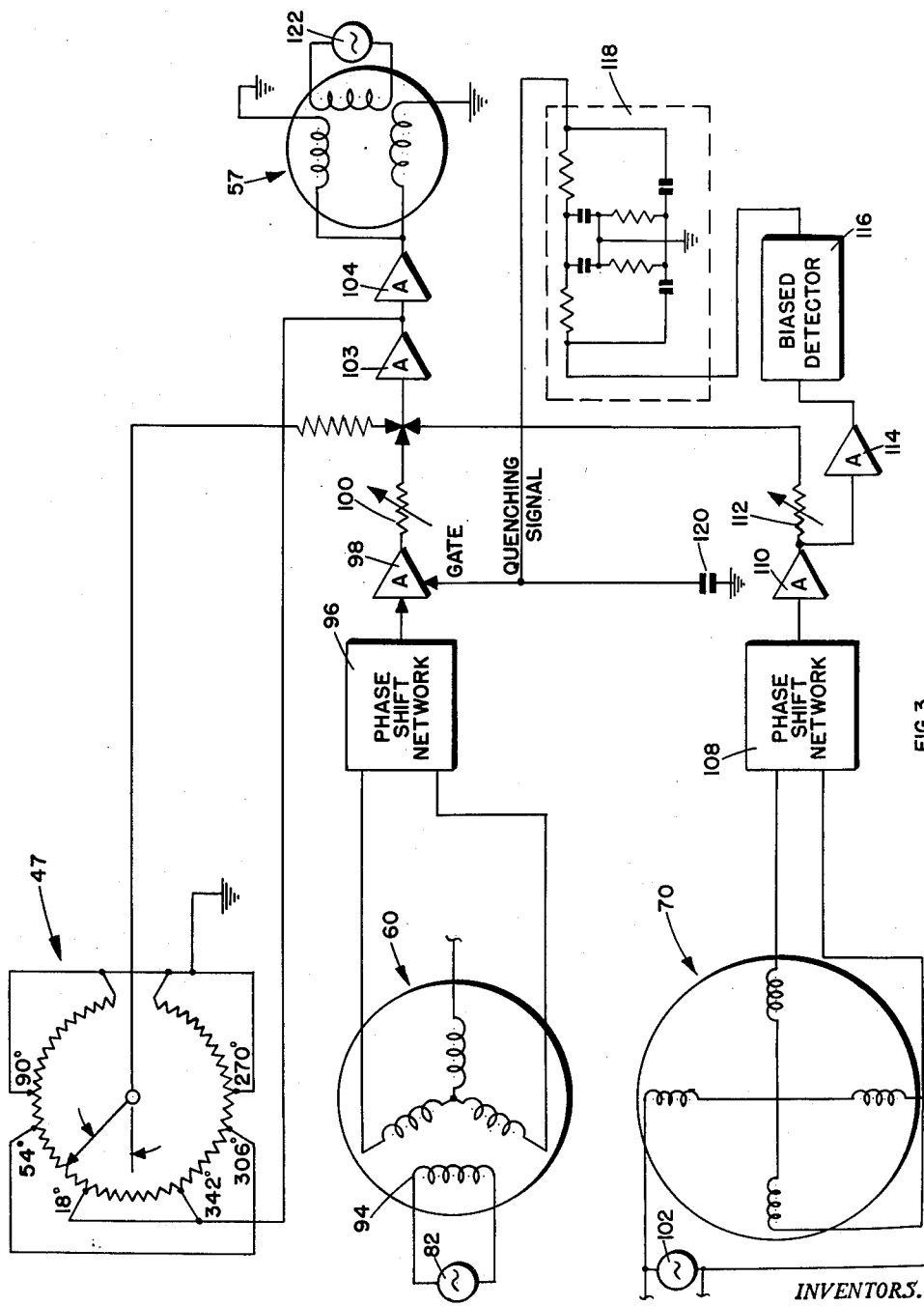

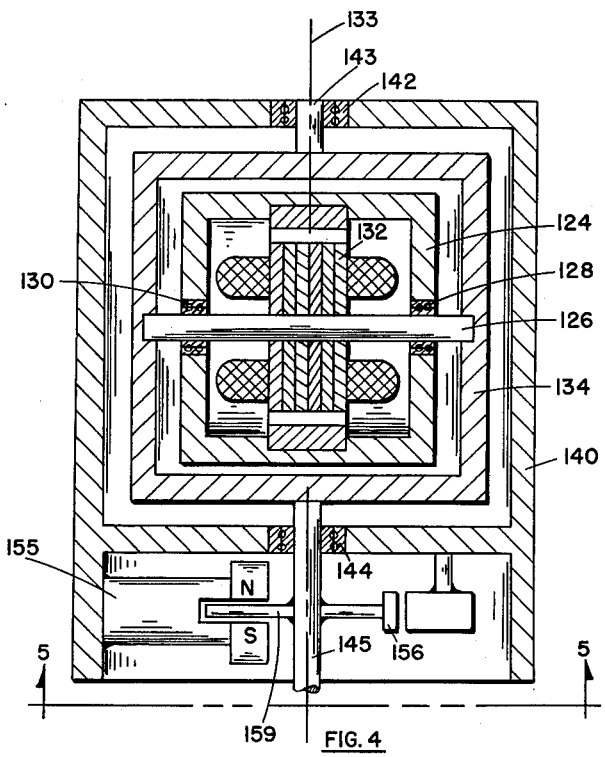
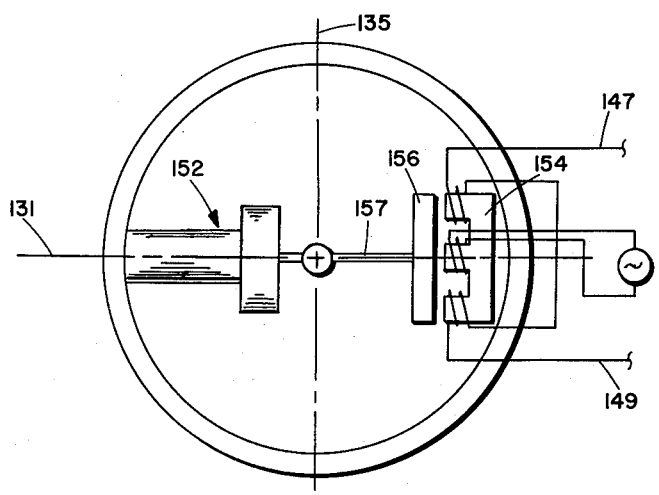

United States Patent Office 3,029,646
Patented Apr. 17, 1962

3,029,646
GIMBAL SUPPORT FOR A STABLE ELEMENT
John M. Slater, Fullerton, Donald E. Findley, Whittier, and John F. Leicester III, Downey, Calif., assignors to North American Aviation, Inc.
Filed Mar. 8, 1956, Ser. No. 570,381
12 Claims. (Cl. 74—5.34)

This invention pertains to a gimbal support for a stable element and, more particularly, to a gimbal support system for a navigational device which allows complete freedom of angular motion of the stable element.

In the field of navigational aids for airplanes, utilization of gyroscope assemblage and gimbals to provide a stabilized platform for inertial elements is well-known. In the past, it was conventional to have a gimbal system with three degrees of angular freedom. Using a set of gimbals which has three degrees of angular freedom presents a serious problem. There are certain attitudes of the inertial platform relative to the supporting vehicles which cause two or more gimbals to align themselves in such a way as to cause one or two of the degrees of angular freedom to be lost. This situation, which is common in stabilized navigational aids, is known as "gimbal lock" and is highly undesirable in that, with only one or two degrees of angular freedom among the set of gimbals, the operability of the gyroscopes and gimbals becomes seriously impaired.

To remove all possibility of gimbal lock and insure that at least three degrees of angular freedom is maintained at all times, this invention provide an additional gimbal and means for driving this additional gimbal to cause the axes of rotation of the remaining gimbals to be maintained substantially at right angles to each other to cause the stable element to have universal freedom of angular rotation at all times.

It is therefore an object of this invention to provide means for supporting a stable element for universal freedom of operation.

It is another object of this invention to provide a gimbal system for supporting a stable element for universal freedom of angular rotation.

It is a further object of this invention to provide a gimbal support for an inertial element.

It is a further object of this invention to provide a gimbal support which is protected from "gimbal lock."

It is still another object of this invention to provide a gimbal system having four axes of rotation including at least three gimbals and means for driving the outermost gimbal about its axis of rotation.

It is yet another object of this invention to provide an improved gimbal system for stabilizing a platform in space.

Other objects of invention will become apparent from the following description taken in connection with the accompanying drawings, in which:

FIG. 3 is a schematic diagram of the electrical portion of a typical mechanization of the device of this invention;

FIG. 4 is a view, partially in section, of a typical gyroscope utilized in the inertial element of FIG. 1;

FIG. 5 is a view taken along the line 5—5 of FIG. 4;

Figure 1:
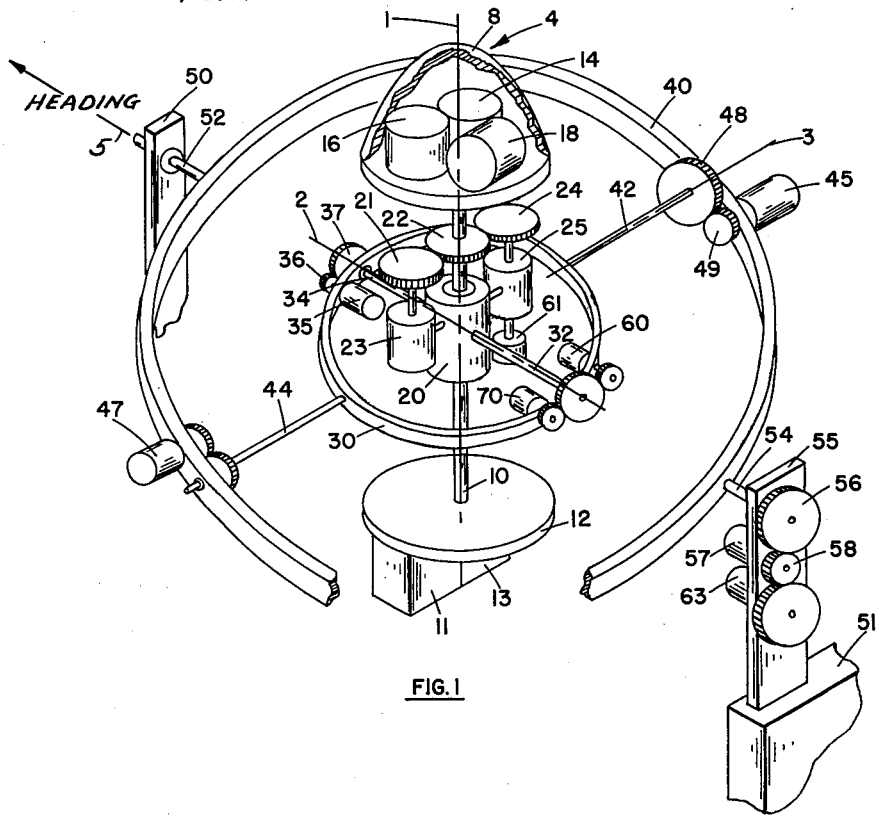
FIG. 1 is an isometric view, partly in section, of the structure of this invention.
Figure 6:
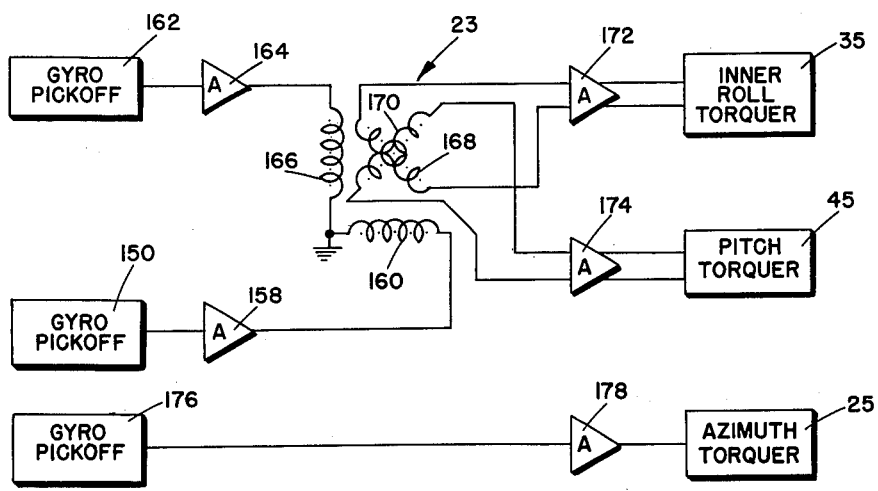

And FIG. 6 is a block diagram of the electrical portion of the stabilizing element of FIG. 1.

Referring now to FIG. 1, stable element 4 is shown as a dumbell-shaped structure comprising a shaft 10 joining structure 8 at one end to table 12 at the other end. Stable element 4 in this invention is intended to remain stabilized in space about all axes. Structure 8 supports a set of three single axis gyroscopes 14, 16 and 18 with orthogonal input axes. Table 12 carries a pair of accelerometers 11 and 13 or any other objects which are to be stabilized. Shaft 10 is supported for rotation in gimbal 20 having transverse coaxial shafts 32 and 34 mounted for rotation about a cross axis in a second gimbal member 30. Gimbal 30 has coaxial shafts 42 and 44 mounted for rotation in an outer gimbal ring 40. Gimbal 40 is connected by shafts 52 and 54 to frames 50 and 55 for rotation relative to the vehicle 51. Resolver 23 is connected to be turned when shaft 10 turns by the meshing of gear 21 with gear 22 upon shaft 10. Gears 21 and 22 have a 1:1 ratio. Torquer 25 is connected to generate a torque by the intermeshing of gear 24 and gear 22 upon shaft 10.

Stable element 4 in a typical arrangement will be maintained vertical and in some predetermined azimuth orientation, e.g., NSEW, with the aid of accelerometer and other controls not in themselves a part of this invention. Accordingly, axis 1, the axis of rotation of shaft 10, may be called the azimuth axis. Axis 2, the axis of rotation of coaxial shafts 32 and 34, is called the inner roll axis. Axis 2 is perpendicular to axis 1. Axis 3, the axis of rotation of coaxial shafts 42 and 44, is called the pitch axis, and axis 5, the axis of rotation of coaxial shafts 52 and 54, is called the outer roll axis. Torquer 35 is connected to gimbal 30 to generate a torque between shaft 34 and gimbal 30 by means of gears 36 and 37. Torquer 45 is connected to gimbal 40 to generate a torque between gimbals 30 and 40 about the axis of shafts 42 and 44 by means of gears 48 and 49. Position pickoff 60 and tachometer 70 are coupled to detect angular deflection, and rate of deflection, respectively, of shaft 32 with respect to gimbal 30. Torquer 57 is connected to vehicle 51 to generate a torque between vehicle 51 and shaft 54 by means of gears 56 and 58.

Attitude and heading information may be obtained from the system, in any maneuver, from position synchros 61, 47 and 63 gear-coupled to members 10, 30 and 40, respectively.

Figure 2:
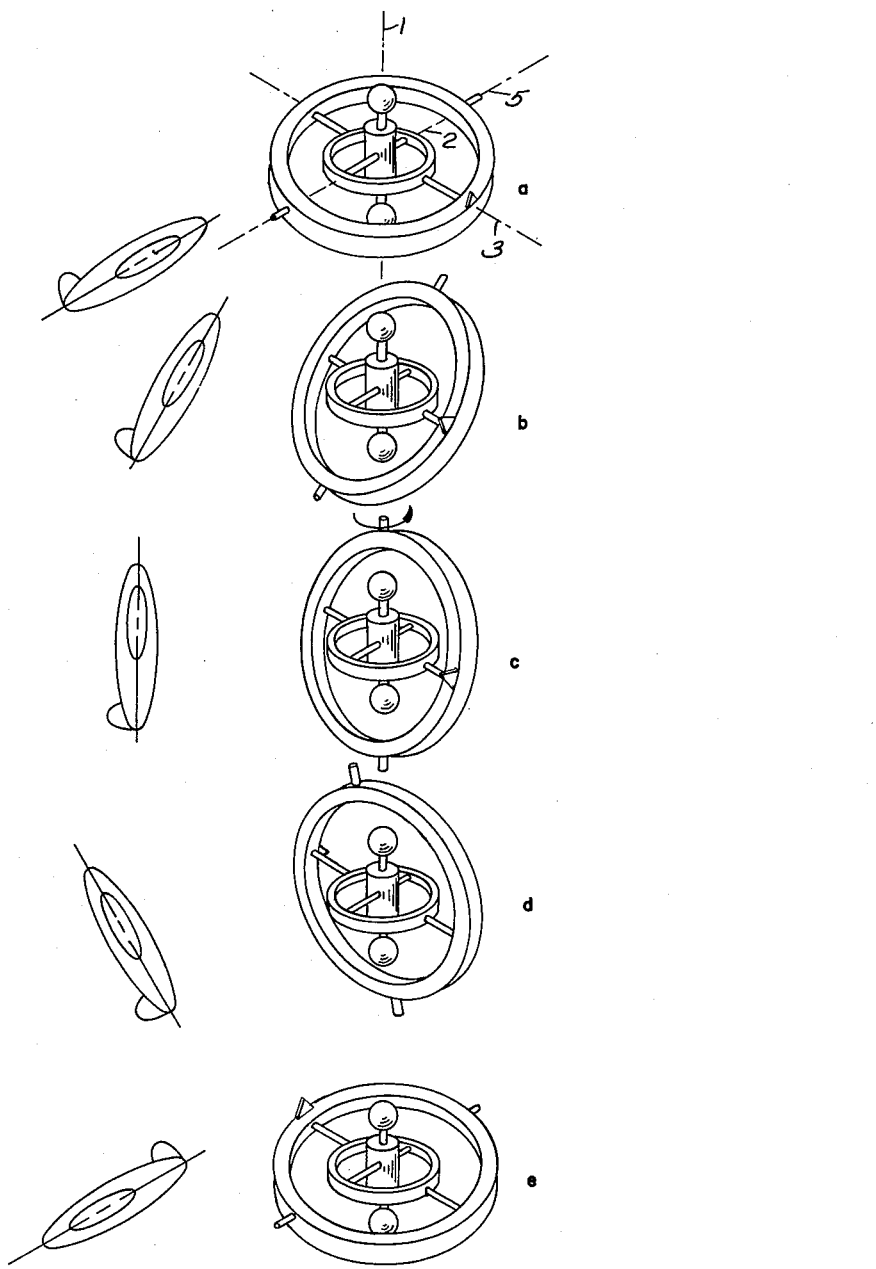
FIG. 2 is an isometric view showing the relative orientation of the axes of the device of FIG. 1 during various flight conditions.

Turning now to FIG. 2, several isometric diagrams are shown which illustrate the relative orientation of the axis of the gimbal system during various flight conditions. Operation of the system will be described in an airplane passing through a vertical loop followed by a barrel roll at which time the airplane is again in straight and level flight.

FIG. 2A shows the gimbal system as oriented when the airplane is in straight and level flight. If the airplane, while in the orientation of FIG. 2A, rolls to a small angle of say five degrees, the five degrees tilt of gimbal 30, relative to the azimuth axis 1 as sensed by pickoff 60, is compensated by a servo system which causes an equal and opposite angular movement of the outer gimbal 40 to reduce the error to zero.

In FIG. 2B, the airplane is climbing at an angle of say 60°, any rotation of gimbal 30, about axis 32 (as, for example, if some roll occurs) is sensed by pickoff 60, and will now require an angular movement of outer gimbal 40 about the outer roll axis 5 equal to twice the tilt angle (at the particular climb angle of 60°) to reduce the tilt angle of gimbal 30 to zero. At higher climb angles, the ratio of ratio of gimbal 40, at a given tilt angle of gimbal 30, is still higher. Since the power available at the outer gimbal servo 57 is not infinite, gimbal 40 will lag quick changes in the tilt angle.

In FIG. 2C, the airplane is flying exactly vertically. The angle between the outer roll axis 5 and the inner roll axis 2 is 90° and axis 5 is aligned with azimuth axis 1. As the airplane passes through this 90° angle and turns over on its back as shown in FIG. 2D, it might first be thought that stable element 4 would simply pass through outer gimbal 40. This, however, cannot take place because the condition would become unstable in that the slightest roll angle will call for rotation of gimbal 40 at a speed incapable of being produced by servo 57.

FIG. 2E again shows the airplane in level flight. The loop has been completed and the aircraft then does a half barrel roll to right itself. Gimbal 40 is again aligned right side up, as in FIG. 2A, but has rotated an angle of 180°. Outer gimbal 40 is thus automatically actuated in a sense to keep gimbal 30 normal to the azimuth axis 1, which is the vertical axis, of course.

Referring now to FIG. 3, a schematic diagram shows the mechanization of the electrical portion of this device. Inertial element 4 maintains itself angularly in space by means of the structure to be described hereinafter in connection with FIGS. 4 and 5. Pickoff 60, upon the inner roll axis of the device of FIG. 1, is preferably a synchro transformer. Synchro 60 is connected to voltage source 82 by its excitation or field coil 94. Two windings of the Y connected rotor of synchro 60 are connected electrically to phase shift network 96 which is a network which merely shifts the phase of the electrical signal sufficiently to provide a quadrature voltage (relative to source 122) for operating a two-phase motor (torquer 57). The third winding remains unconnected in the embodiment shown. The output of phase shift network 96 is connected through amplifier 98 and variable gain resistor 100 to the input of amplifier 103. Amplifier 103 is a feed-back amplifier with a feed-back loop through potentiometer 47. In the particular embodiment shown amplifier 103 is an inverting amplifier and, therefore, its output increases when its input decreases and vice versa. Potentiometer 47 is, therefore, illustrated as providing the greatest amount of feedback (which, of course, is negative feedback due to the fact that amplifier 103 is inverting) at the approximate location of 18° to 342° of pitch by the aircraft. Consequently the least amount of negative feedback is received in the neighborhood of 90° pitch on either side of zero pitch. Amplifier 104, of course, is also an inverting amplifier. The output of amplifier 103 is connected through power amplifier 104 to torque motor 57 upon the outer roll axis.

Induction tachometer 70, mechanically driven by shaft 32, is electrically excited by voltage source 102, which is an alternating voltage source in phase with the voltage of voltage source 82. The amplitude of the voltage at the output terminals of tachometer 70 is directly proportional to the angular velocity of the shaft of tachometer 70. The output of tachometer 70 is connected to phase shift network 108 to shift the output signal from tachometer 70 into quadrature with the signal provided by source 122 (as did phase shift network 96), for energizing a two-phase electric motor (torquer 57). The output of phase shift network 108 is connected through amplifier 110 and variable gain resistor 112 to the input of amplifier 103. The output of amplifier 110 is also connected through amplifier 114 to the input of biased detector 116, which is adapted to allow only the signals which are above a predetermined amplitude to be conducted. The output of bias detector 116 is connected through alternating current reject network 118, bypassed by condenser 120 to amplifier 98, which is a gated amplifier. When a signal is received from alternating current reject network 118, amplifier 98 ceases to amplify the output of phase shift network 96. Alternating current reject network 118 is tuned to reject signals of the frequency of alternating current voltage source 102 to provide a substantially direct current signal to control the gate of amplifier 98. Torquer 57 is excited upon its field winding by alternating voltage source 122, which is in phase with the voltage of voltage source 82. Torquer 57 is a two-phase motor adapted to be controlled by the output of amplifier 104.

In operation, let us first assume vehicle 51 of FIG. 1 is an aircraft performing normal maneuvers about its yaw, pitch and roll axes.

Angular motion of the azimuth axis with respect to the pitch axis is detected by pickoff 60 and angular rate of rotation of said axes is measured by pickoff 70. The output of pickoff 60 is connected to phase shift network 96 which feeds a quadrature voltage through amplifier 98 and resistor 100 to amplifier 103. The angular rate of rotation output from pickoff 70 is fed through phase shift network 108, amplifier 110 and variable gain resistor 112 to the input of amplifier 103. Should vehicle 51 be experiencing rotation about its pitch axis, potentiometer 47, connected to measure angular motion of the pitch axis with respect to the outer roll axis, feeds this measurement to amplifier 103. Amplifier 103 also provides a feed-back loop through potentiometer 47, which acts to increase the gain of the amplifier with increase in pitch. The output of amplifier 103, containing the necessary torque signals received from pickoffs 60 and 70 and potentiometer 47, is connected through amplifier 104 to torquer 57, which torques gimbal 40 of FIG. 1 a sufficient amount to cause the azimuth, inner roll, and pitch axes of the device to remain substantially orthogonal.

Now let us assume vehicle 51 of FIG. 1 performs a more complicated maneuver such as the flight described for FIG. 2 in which the airplane passes through a vertical loop followed by a barrel roll and then returns to straight and level flight. As vehicle 51 approaches a vertical climb, in the first half of the vertical loop, angular motion signal of pickoff 60 increases much faster than corresponding angular velocity signal from pickoff 70. The output of pickoff 70, however, as the angle increases, rapidly becomes of such a magnitude (by reason of a high ratio of the gears driving it) that when fed through phase shift network 108, amplifier 110 and amplifier 114 to biased detector 116, the amplitude of the signal is sufficient to cause biased detector 116 to send a signal to alternating reject network 118, which provides a direct current signal to amplifier 98, for example, to the screen grid of a pentode, which prevents amplifier 98 from conducting. Therefore, no further signal from pickoff 60 is allowed to reach torquer 57. Velocity pickoff 70 thus then provides the entire signal to torquer 57 through amplifiers 103 and 104, as described above. When gimbal 40 is in a position halfway between that shown in FIGURE 2c and FIGURE 2d, it will be appreciated that inner roll axis 32 is athwartship, that is, transverse of the aircraft. The entire aircraft angular velocity, in making its vertical loop, is therefore now expressed about the inner roll axis 32, so as to cause tachometer 70 to generate a large signal to cause the gimbal to "flop over," that is, complete its rotation about the vertical. As vehicle 51 approaches the second half of the loop, the signal from pickoff 70 falls below the necessary amplitude to cause biased detector 116 to conduct and thereby allows position pickoff 60 to again provide control to torquer 57.

FIGS. 4 and 5 show in central vertical section, and end elevation, the elements of a typical gyroscope suitable for use in connection with the invention. A rotor 124 of substantial moment of inertia is supported on ball bearings 128 and 130 for spinning at high speed by an electric motor 132. The bearing shaft 126 is fixed to a gimbal member 134, which is pivoted to a housing 140 by shafts 143 and 145 and bearings 142 and 144. Bearings 142 and 144 are of minimum-friction type. In standard nomenclature for gyroscopes of the type shown, the normal undeflected direction of the rotor spin axis is termed the spin reference axis which is shown as axis 131 in FIG. 5. The gimbal axis at right angles to axis 131 is designated the output axis 133 as shown in FIG. 4. The input axis is perpendicular to the other two axes. Axis 135, the input axis perpendicular to axes 131 and 133, is shown in FIG. 5. An angle pickoff is provided at output axis 133 which is shown as of the variable transformer type including an iron shoe 156 carried on an arm 157 and opposed to a three-pole iron member 154 with a coil on the middle pole excited by a constant A.-C. and oppositely wound coils on the outer poles. On displacement of the shoe, an alternating current of phase and amplitude depending on the displacement appears at the output of terminals 147 and 149.

It is customary, also, to supply means for applying a torque to the gyroscope about its output axis; hence, torquer 152 is supplied which has a coil 159 extending into the gap of a permanent magnet 155. On energization of coil 159 with direct current, a proportional moment is applied about the gyroscope output axis 133. Torquer 152 permits the application of control torquer to the gyroscope from accelerometers or other sources.

In FIG. 6 is shown a diagram of the electrical portion of the stabilizer element of FIG. 1. Gyro pickoff 150 of gyroscope 16 is connected through amplifier 153 to coil 160 of azimuth axis resolver 23. Gyro pickoff 162 of gyroscope 14 is connected through amplifier 164 to coil 166 of azimuth axis resolver 23. Coil 168 is connected in quadrature with coil 170. Coils 168 and 170 are rotatable. The electrical output of coil 168 is connected through amplifier 172 to drive inner roll torquer 35. The electrical output of coil 170 is connected through amplifier 174 to drive pitch torquer 45. Gyro pickoff 176 of gyroscope 18 is connected through amplifier 178 to drive azimuth torquer 25. Any stray torque at table 8, which otherwise would cause said table to drift, is thus sensed by gyroscopes 14, 16 and 18, and an opposing torque is applied from the servo system.

Summarizing the complete operation of the gimbal system in relation to FIGS. 1, 3 and 6:

Initially the azimuth axis is stabilized parallel to a vertical direction in space. The inner roll axis is perpendicular to the azimuth axis, the pitch axis is perpendicular to the inner roll axis, and the outer roll axis is perpendicular to the pitch axis. There is no angular motion of the gimbal system about the inner roll axis and no signal is detected by pickoffs 60 and 70. The position and velocity signals received from pickoffs 60 and 70 upon a roll motion of the aircraft are sent through phase shift networks and through amplifiers which sends them through amplifier 103 which, in turn, feeds torquer 57. Torquer 57 causes gimbal 40 to rotate through the outer roll, thereby causing the pitch axis to remain perpendicular to the azimuth, vertical axis. This operation as described above serves for a simple maneuver of the airplane.

For the more complicated maneuver, when the airplane is rotating about all its axes, 1, 2, 3, and 5, the problem of an excessive position error signal from pickoff 60 is presented. Pickoff 70, which is an indication of the velocity error, is used to quench the signal received from pickoff 60. A large velocity signal from pickoff 70 is fed through amplifier 114 to the input of biased detector 116, which, because of the magnitude of the signal sends a signal to alternating current reject network 118 whose output is connected to amplifier 98, which acts to block the output of phase shift network 96. The output of amplifier 110 is also fed through resistor 112 to amplifier 103. The output of amplifier 103 is connected through amplifier 104 to torquer 57 which torques gimbal 40 about the outer roll axis. The quenching of the position signal from pickoff 60 whenever the rate of rotation between the gimbal 30 and gimbal 20, that is, about shaft 32 (as detected by tachometer 70) becomes large, allows the velocity signal alone to drive the gimbal 40 into a "flop over". This eliminates the instability in the gimbal system.

Assuming again that the airplane is in the flight path described in FIG. 2, at the beginning of the roll the outer roll gimbal 40 requires no rotation about the outer roll axis until the airplane is in a vertical climb, at which time the outer gimbal 40 system should rotate through 180°. Whenever the angle between the inner roll axis and the outer roll axis exceeds 90°, the aircraft being at the top of the loop commencing to fall over on its back, the effect of an error signal from pickoff 60, when the aircraft is in this position, is to drive outer roll gimbal 40 toward "flop over," that is, reversal. When the gimbal is half reversed (mid-position between FIGS. 2c and 2d) it will be appreciated that the inner roll axis 2 is then athwartship and a continuation of the loop by the plane causes considerable motion about the inner roll axis. Therefore, large signals are generated by tachometer 70 and the gimbal 40 is caused to complete its rotation, or "flop over." Because of the finite reversal time required of the servo system, the error angle which exceeds 90° during the early part of the reversal and the error angle about the inner roll axis will increase very fast to permit gimbal 20 to retain stable. This corresponds to a large position error signal from pickoff 60 throughout almost the entire reversal period in a direction to drive gimbal 30 to its stable null position. During the first half of the reversal, this large error signal is increasing and, thus, the velocity error signal from pickoff 70 is of a sense to accelerate gimbal 40. However, as the system passes through 90°, the velocity error signal from pickoff 70 reverses and attempts to decelerate gimbal 40. However, the position error signal from pickoff 60 is so strong that it will completely override the velocity signal from pickoff 70 and gimbal 40 will acquire an excessive momentum which will tend to cause gimbal 40 to exceed physical limit stops, and unless this position error signal from pickoff 60 is quenched, the stabilized platform would suffer the physical breakdown.

Thus, it can be seen that by using a four-axis gimbal system and a servo system which quenches the excessive position error, the gimbal system remains stabilized throughout any type of maneuver.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for supporting a mass comprising a shaft attached to said mass for rotation about a first axis, a first gimbal attached to said shaft for rotation about a second axis perpendicular to said first axis, a second gimbal attached to said first gimbal for rotation about a third axis perpendicular to said first axis, a third gimbal attached to said second gimbal for rotation about a fourth axis means for rotating said third gimbal about said fourth axis, means for measuring angular deviation from perpendicularity of said axes, and means responsive to said measuring means for mechanically driving said third gimbal by a predetermined amount, and means responsive to a pitch angle of approximately 90° between said third gimbal and said second gimbal for rotating said third gimbal 180°, so as to maintain said first three axes substantially orthogonal.

2. Means for supporting an interial element comprising a shaft attached to said element for rotation about a first axis, a first gimbal attached to said shaft for rotation about a second axis perpendicular to said first axis, a second gimbal attached to said first gimbal for rotation about a third axis perpendicular to said first axis, a third gimbal attached to said second gimbal for rotation about a fourth axis, means for measuring angular deviation from perpendicularity between said first and said third axes, and means responsive to said measuring means for mechanically driving said second gimbal by a predetermined amount to maintain said first and second axes substantially orthogonal and means for determining the angular deviation between said second gimbal and said third gimbal and means for causing said third gimbal, to be controlled to rotate 180° in response to predetermined output of said means for measuring angular deviation.

3. Means for supporting an inertial element comprising a shaft attached to said element for rotation about a first axis, a first gimbal attached to said shaft for rotation about a second axis, a second gimbal attached to said first gimbal for rotation about a third axis, a third gimbal attached to said second gimbal for rotation about a fourth axis, means for measuring angular deviation of said axes from a predetermined relative orientation, motive means responsive to said measuring means and connected to drive said third gimbal about said fourth axis by a predetermined amount to cause said fourth axis to tend to align itself with said second axis and means responsive to the angle between said third gimbal and said second gimbal, the angle between said first axis and said third axis and the angular velocity between said first axis and said third axis for rotating said third gimbal 180°.

4. Means for supporting an inertial element comprising a shaft attached to said element for rotation about a first axis, a first gimbal attached to said shaft for rotation about a second axis, a second gimbal attached to said first gimbal for rotation about a third axis, a third gimbal attached to said second gimbal for freedom of rotation about a fourth axis, in level position, coaxial with said second axis, means for measuring angular deviation from perpendicularity of said axes, motive means responsive to said measuring means and connected to drive said third gimbal about said fourth axis by a predetermined amount to cause said fourth axis to rotate along with said second gimbal about said second axis, and means for determining the pitch angle between said third gimbal and said second gimbal, said motive means being at least partially responsive to said latter mentioned means, and means for blocking the signal from said means for measuring angular deviation upon predetermined angular velocity of said second gimbal about said second axis.

5. Means for supporting an inertial element comprising a shaft attached to said element for rotation about a first axis, a first gimbal attached to said shaft for rotation about a second axis, a second gimbal attached to said first gimbal for rotation about a third axis, a third gimbal attached to said second gimbal for freedom of rotation about a fourth axis, motive means connected to drive said third gimbal about said fourth axis by a predetermined amount to cause said second gimbal to remain substantially orthogonal to said first axis, and means responsive to a pitch angle of approximately 90° between said third gimbal and said second gimbal for controlling the rotation of said third gimbal to be 180°.

6. Means for supporting an inertial element in a vehicle for universal freedom of rotation relative to said vehicle comprising a shaft attached to said element for freedom of rotation about a first axis, a first gimbal attached to said shaft for limited freedom of rotation about a second axis perpendicular to said first axis, a second gimbal connected to said first gimbal for limited freedom of rotation about a third axis perpendicular to said second axis, a third gimbal attached to said second gimbal relative to said vehicle with freedom of rotation about a fourth axis which has a fixed orientation relative to said vehicle and which is perpendicular to said third axis, pickoff means for detecting misalignment of said second gimbal relative to said inertial element about said second axis, torquing means connected between said vehicle and said third gimbal about said fourth axis, and servo means connected between said pickoff and said torquing means including a resolver connected between said second and third gimbals, said servo means responsive to substantially 90° in angle between said second and third gimbals to cause said third gimbal to be controlled to rotate 180°, whereby said first, second and third axes are maintained substantially orthogonal.

7. Means for supporting an inertial element in a vehicle for universal freedom of rotation relative to said vehicle comprising a shaft attached to said element for freedom of rotation about a first axis, a first gimbal attached to said shaft for limited freedom of rotation about a second axis perpendicular to said first axis, a second gimbal connected to said first gimbal for limited freedom of rotation about third axis perpendicular to said second axis, a third gimbal attached to said second gimbal relative to said vehicle with freedom of rotation about a fourth axis which has a fixed orientation relative to said vehicle and which is perpendicular to said third axis, pickoff means for detecting misalignment of said second gimbal relative to said inertial element about said second axis; servo means including a resolver connected between said first and second gimbals to measure misalignment of said second gimbal relative to said first gimbal about said second axis, torquing means connected between said vehicle and said third gimbal and responsive to said pickoff and said servo means to torque said third gimbal whereby said first, second and third axes are maintained substantially orthogonal to prevent gimbal lock.

8. Means for supporting an inertial element comprising a shaft rotatably attached to said element about a first axis, a first gimbal rotatably attached to said shaft about a second axis, a second gimbal rotatably attached to said first gimbal about a third axis, a third gimbal rotatably attached to said second gimbal about a fourth axis perpendicular to said third axis, first pickoff means connected between said first and second gimbals to measure the angle between said first and third axes, second pickoff means connected between said second and third gimbals to measure the angle between said second and third axes, third pickoff means connected between said second and third gimbals to measure the angle between said second and fourth axes, the output of said first pickoff means being connected to the input of said third pickoff means, servo means connected to the output of said third pickoff, torquer means attached to said third gimbal and connected to the output of said servo means whereby the axes of rotation of said gimbals and said shaft are maintained substantially orthogonal.

9. A device as recited in claim 8 and further comprising a velocity pickoff attached between said first and second gimbals to measure the angular rate of rotation of said first axis relative to said third axis about said second axis and having its output connected to said servo means to eliminate the output of said servo means when the output of said velocity pickoff reaches a predetermined value.

10. Gimbal means for supporting a platform comprising a shaft attached to said platform for rotation about a first axis, a first gimbal attached to said shaft for rotation about a second axis, a second gimbal attached to said first gimbal for rotation about a third axis perpendicular to said second axis a third gimbal attached to said second gimbal for rotation about a fourth axis, pickoff means connected between said first and second gimbals to measure the angle between said first and third axes, resolver means connected between said second and third gimbals to measure the angle between said second and fourth axes, the output of said pickoff means connected to the input of said resolver, motor means connected to drive said third gimbal, and servo means connected between the output of said resolver and said motor means attached to said second gimbal whereby said platform has universal freedom of angular movement and said first, second and third axes are maintained substantially orthogonal.

11. Means for supporting a stable element in a vehicle comprising a first roll gimbal attached to said vehicle for rotation in roll, a pitch gimbal attached to said first roll gimbal for rotation in pitch, a second roll gimbal attached to said pitch gimbal for rotation in roll, means for securing said element to said second roll gimbal for rotation in azimuth and means responsive to a pitch angle of approximately 90° between said first roll gimbal and said pitch gimbal, the angle between said first roll gimbal and said second roll gimbal and the angular velocity between said first roll gimbal and said second roll gimbal, for rotating said first roll gimbal 180°.

12. Means for supporting a mass in a vehicle comprising a plurality of gimbals rotatably mounted relative to each other, one of said gimbals being connected to said mass for rotation relative thereto about a first axis, another of said gimbals being connected to said one of said gimbals for rotation about a second axis normal to said first axis, said another of said gimbals further being connected to said vehicle for rotation about a third axis coplanar with said first axis and normal to said second axis, means for providing signals indicating angular displacement about said first axis between said one of said gimbals and said mass, and means responsive to said means for providing signals for rotating said another of said gimbals 180° when the angle between said one of said gimbals and said another of said gimbals reaches substantially 90°.

References Cited in the file of this patent

UNITED STATES PATENTS

| | | |
|---|---|---|
| 2,005,530 | Boykow | June 18, 1935 |
| 2,591,697 | Hays | Apr. 8, 1952 |
| 2,631,455 | Wing | Mar. 17, 1953 |
| 2,756,598 | Hammond | July 31, 1956 |
| 2,762,123 | Schultz et al. | Sept. 11, 1956 |
| 2,835,131 | Vacquier et al. | May 20, 1958 |
| 2,949,785 | Singleton et al. | Aug. 23, 1960 |

UNITED STATES PATENT OFFICE
CERTIFICATE OF CORRECTION

Patent No. 3,029,646                      April 17, 1962

John M. Slater et al.

It is hereby certified that error appears in the above numbered patent requiring correction and that the said Letters Patent should read as corrected below.

Column 1, line 31, for "provide" read -- provides --; column 2, line 63, for "ratio", second occurrence, read -- rotation --; column 4, line 69, for "spin reference axis" read -- spin reference axis --; line 72, for "input axis" read -- input axis --; column 6, line 17, for "retain" read -- remain --.

Signed and sealed this 25th day of September 1962.

(SEAL)
Attest:

ERNEST W. SWIDER
Attesting Officer

DAVID L. LADD
Commissioner of Patents